United States Patent [19]

Isenberg

[11] Patent Number: 4,490,444
[45] Date of Patent: Dec. 25, 1984

[54] HIGH TEMPERATURE SOLID ELECTROLYTE FUEL CELL CONFIGURATIONS AND INTERCONNECTIONS

[75] Inventor: Arnold O. Isenberg, Forest Hills, Pa.

[73] Assignee: Westinghouse Electric Corp., Pittsburgh, Pa.

[21] Appl. No.: 323,641

[22] Filed: Nov. 20, 1981

Related U.S. Application Data

[63] Continuation of Ser. No. 219,204, Dec. 22, 1980, abandoned.

[51] Int. Cl.³ .............................................. H01M 8/12
[52] U.S. Cl. .................................... 429/31; 429/32; 429/34
[58] Field of Search ............... 429/31, 32, 30, 40, 429/191, 34, 33

[56] References Cited

U.S. PATENT DOCUMENTS

| | | | |
|---|---|---|---|
| 3,138,488 | 6/1964 | Tragert | 429/31 X |
| 3,228,797 | 1/1966 | Brown et al. | 429/13 |
| 3,331,706 | 7/1967 | Jenkins | 429/30 |
| 3,402,230 | 9/1968 | White, Jr. | 429/31 X |
| 3,460,991 | 8/1969 | White, Jr. | 429/30 |
| 3,525,646 | 8/1970 | Tannenberger et al. | 429/31 |
| 3,527,689 | 9/1970 | Taylor | 204/278 |
| 3,668,010 | 6/1972 | Fally et al. | 429/31 |
| 3,861,959 | 1/1975 | Cadiou | 429/30 |
| 4,038,462 | 7/1977 | Rohr | 429/30 |

FOREIGN PATENT DOCUMENTS

| | | | |
|---|---|---|---|
| 1421621 | 2/1969 | Fed. Rep. of Germany | 429/30 |
| 1809878 | 6/1970 | Fed. Rep. of Germany | |
| 2614728 | 10/1977 | Fed. Rep. of Germany | |
| 6512675 | 3/1967 | Netherlands | |

*Primary Examiner*—Anthony Skapars
*Attorney, Agent, or Firm*—D. P. Cillo

[57] ABSTRACT

High temperature fuel cell configurations and interconnections are made including annular cells having a solid electrolyte sandwiched between thin film electrodes. The cells are electrically interconnected along an elongated axial outer surface.

20 Claims, 5 Drawing Figures

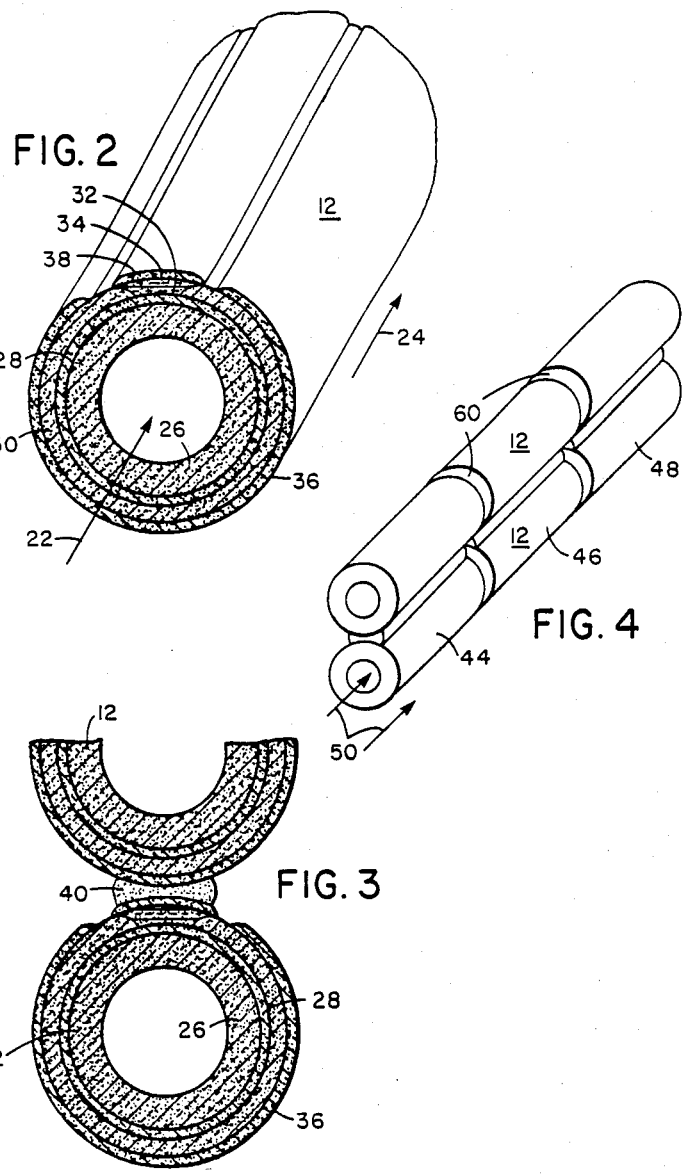

HIGH TEMPERATURE SOLID ELECTROLYTE FUEL CELL CONFIGURATIONS AND INTERCONNECTIONS

This is a continuation of application Ser. No. 219,204, filed Dec. 22, 1980, now abandoned.

BACKGROUND OF THE INVENTION

1. Field of the Invention

This invention relates to fuel cell configurations and more particularly to electrical and structural arrangements of a plurality of such solid electrolyte fuel cells.

2. Description of the Prior Art

High temperature solid electrolyte fuel cells utilizing a natural or synthetic fuel gas such as those containing hydrogen, carbon monoxide, methane, and an oxidant such as oxygen or air, are known. Such cells or stacks of cells operate above 700° C. to directly convert chemical energy of the fuel into direct current electrical energy by electrochemical combustion. A typical cell, for example, reacts hydrogen fuel with oxygen from air to produce electrical energy, water vapor and heat.

Each single cell, however, provides a rather small open circuit voltage, on the order of one volt. Accordingly, plural cells are typically connected in series in order to generate a higher voltage output. Various configurations for these connections are known, such as flat plate or generally tubular arrangements. However, such interconnections have given rise to concerns which are difficult to solve. For example, such cells utilize oxide air electrodes which present high lateral ohmic losses, so that the individual cell size must be small with respect to the direction of current flow. Additionally, multiple ceramic and metallic materials are often integrated, presenting differential thermal expansion and materials compatibility concerns. To minimize such concerns, particularly the ohmic losses, the art has utilized small individual band-shaped cells, on the order of one to two centimeters in length, interconnected by good electrical conductors such as noble metals as well as non-noble metals in combination with oxide conductors. Such designs, however, do not alleviate materials compatibility concerns and require a substantial number of fabrication steps to provide an integrated electrical generator of any substantial size. Additionally, the large number of small components, layers, interconnections, and fabrication steps required in such designs raise substantial concerns regarding low-term reliability.

An example of such tubular "band" designs is provided in U.S. Pat. No. 3,525,646, which discloses a large plurality of small individual cells arranged along the circumference of a porous support tube. Each individual cell is small, and is electrically interconnected in series to the axially next cell along the tube by a conductor. A large plurality of cells, layers and conductive current collectors are required to achieve a substantial voltage. Preferably, the various layers are deposited on the support tube by plasma or flame spray methods. In addition to the concerns discussed above, such band type systems are susceptible to failure in any one cell or interconnect which defeats electrical interconnection for the entire series connected grouping of cells.

Another fuel cell arrangement is described in German Patent Disclosure No. 2,614,728, which, in an effort to obtain high power densities with the fewest possible components, forms scalloped plate type supporting bodies into a plurality of parallel channels. The channels, in conjunction with semicircular electrodes deposited therein, form fuel cells extending the length of the support bodies. The cells are interconnected through abutting radial lips and additional components. This arrangement suffers limitations similar to the deficiencies of the band designs, requiring multiple internal unaccessible connectors, and additionally depends upon the supporting plates for structural integrity. This limits the ability to electrically interconnect the cells in desireable manners, since direct contact with the cell is difficult. Additionally, the air oxidant must diffuse through the relatively thick support plates prior to gaining access to the air electrode.

It is desirable to provide a high temperature solid electrolyte fuel cell arrangement which alleviates the concerns of present designs and increases reliability.

SUMMARY OF THE INVENTION

This invention provides high temperature solid electrolyte fuel cell configurations and cell arrangements which substantially enhance reliability and alleviate many of the prior art deficiencies such as high ohmic losses, thermal expansion and other materials compatibility concerns.

In preferred form, a fuel cell arrangement or cell stack is formed of a plurality of individual long annular cells of various cross-sectional shapes, each on the order of 30 cm. or more in length, and each joined electrically in series to the next through an at least one interconnection extending the full axial length of the cell. Each cell is formed of a long inner porous support tube for structural integrity. Surrounding the tube periphery is a thin film porous electrode, preferably an air electrode or cathode. About the cathode is the solid electrolyte, which is in turn surrounded by the second porous electrode, preferably a fuel electrode or anode.

While the preferred inner cathode is a complete annular structure, the solid electrolyte and outer anode structures are discontinuous to provide space for an electrical interconnection for series contact between the cathode of one cell and the anode of the next cell. The interconnection on one side is contiguous with, or adjacent and otherwise electrically coupled to, a small radial segment of the inner cathode, generally along its entire axially active length. Bonded to the opposite side of the interconnection preferably is a contact segment of a porous electrode type material.

In this manner, each elongated tubular cell has a generally full length contact segment surface which can be readily placed electrically in series with an outer surface of a parallel cell. Preferably, the series connection is made through an elongated metal felt, metal strip or metallized inlay, disposed between two adjacent annular cells.

This arrangement provides a high reliability system since electrical connection is not merely through a large number of small current collecting conductors, but is made through an elongated surface spinning the active length of the tubular cell. Thus, localized failure will not defeat current transfer since the large portion of the contact surface which has not failed is still operational. Additionally, ohmic losses are small since the current is directed from one cell to the next through a short path which is normal to the annular surface. And, the disclosed arrangement needs only two main current collectors for any number of cells in series, one elongated axial collector at each end of the series of cells.

Another advantage of the elongated single cell concept is the ability for arranging cells electrically in series-parallel with, for example, cubic dense packing of tubes. The parallel connection is made through adjacent outer peripheries. This method of cell interconnection allows a multitude of interconnected cells in order to achieve any desired current and voltage combination.

BRIEF DESCRIPTION OF THE DRAWINGS

The advantages, nature, and additional features of the invention will become more apparent from the following description, taken in connection with the accompanying drawing, in which:

FIG. 2 is an isometric section view of a singular tubular fuel cell;

FIG. 3 is a section view through two adjacent cells, particularly showing the interconnection between the cells;

FIG. 4 is an isometric schematic of another system configuration; and

DESCRIPTION OF THE PREFERRED EMBODIMENTS

Figure 1:
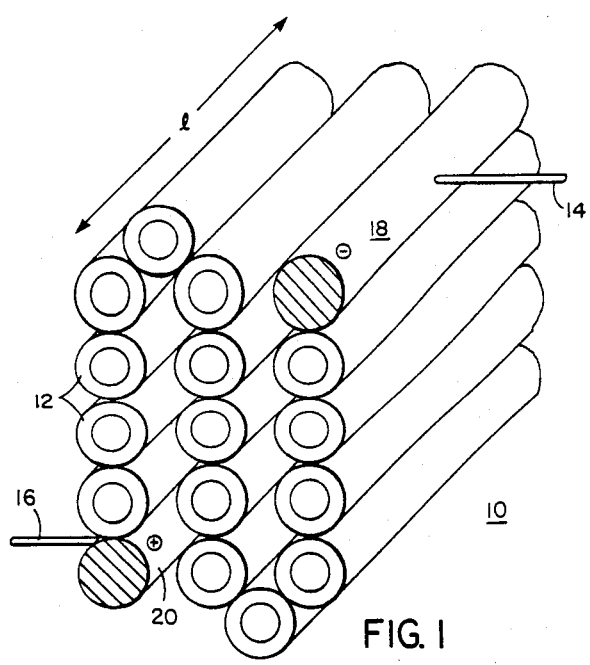
FIG. 1 is a schematic isometric view of a fuel cell system in accordance with the invention.

Referring now to FIG. 1, there is shown a fuel cell arrangement 10, also herein referred to as a stack, comprised of a plurality of elongated annular fuel cells 12. Each fuel cell 12 is preferably tubular, and is electrically connected, in series, to an adjacent cell 12. Annular geometric configurations other than tubular are equally possible. This electrical connection is made along a selected axial length (1) of the cells, preferably the entire electrochemically active length. Each cell 12 generates an open circuit voltage of approximately one volt, and hundreds of cells 12 can be connected in series in order to provide a desired system voltage. The stack energy can be usefully withdrawn through leads 14 and 16, respectively electrically connected to current collecting bus bars 18 and 20. The two bus bars 18, 20 preferably extend, and are in contact with, the entire active length of the cells 12 at the ends of the stack.

FIG. 2 shows the preferred configuration for each annular fuel cell 12. The preferred configuration is based upon a system wherein a gaseous fuel, such as hydrogen or carbon monoxide, is directed axially over the outside of the cell 12, as indicated by the arrow 24, and an oxidant, such as air, indicated by the arrow 22, flows through the inside of the cell. It will be recognized that the location of the reactant fuel and oxidant can be interchanged such that air flows about the cells and fuel flows within the cells. This, however, requires the reversal of the cell electrodes, which is herein referred to as an inverted cell structure.

In preferred form, each cell 12 includes a porous support tube 26 which provides structural integrity to the cell. In an exemplary cell 12, the support tube is comprised of calcia stabilized zirconia forming a porous wall approximately one millimeter thick. Surrounding the outer periphery of the support tube 26 is a thin film porous air electrode, or cathode 28. The exemplary system cathode 28 is a composite oxide structure approximately 50 to 500 $\mu$m thick, which is deposited onto the support tube through well-known techniques. The cathode is, for example, comprised of doped and undoped oxides or mixtures of oxides in the perovskite family such as $LaMnO_3$, $CaMnO_3$, $LaNiO_3$, $LaCoO_3$, $LaCrO_3$, doped indium oxide, $In_2O_3$, and other electronically conducting mixed oxides generally composed of rare earth oxides mixed with oxides of cobalt, nickel, copper, iron, chromium and manganese, and combinations of such oxides.

Generally surrounding the outer periphery of the cathode 28 is a layer of gas-tight solid electrolyte 30, comprised of yttria stabilized zirconia approximately 20 to 50 $\mu$m thick, for the exemplary cell. The electrolyte 30 can also be deposited onto the cathode by well known techniques. However, a selected radial segment 32 of the cathode 28 is, for example, masked during fabrication, and an interconnect material 34 is deposited on the segment 32.

The interconnect material 34, which preferably extends the active length of each elongated cell 12, must be electrically conductive in both an oxidant and fuel environment. Accordingly, the exemplary cell includes a gas-tight interconnection 34 approximately the same thickness as the electrolyte, 20 to 50 $\mu$m. The preferred interconnection material is an oxide doped (Ca,Sr,Mg) lanthanum chromite film.

Substantially surrounding the solid electrolyte 30 is a second porous electrode, for example, a nickel-zirconia cermet anode 36. As shown, the anode 36 is also discontinuous, being spaced from the interconnection 34 a distance sufficient to avoid direct electrical communication between the anode 36 and both the interconnection 34 and the cathode 28. The exemplary anode 36 is about 50 $\mu$m thick.

Deposited over the interconnection 34 is a segment 38 which is preferably comprised of the same material as the anode 36, nickel or cobalt zirconia cermet, and of the same thickness, 50 $\mu$m.

FIG. 3 shows the series interconnection between consecutive fuel cells 12. The electrical interconnection is preferably enhanced by a metal felt 40, made, for example, of nickel fibers. The felt extends axially between the annular cells 12, and is bonded to each by pressure contact which causes sinter bonding during operation. In the inverted cell structure, where fuel flows inside of the cells, the felt material is made from conducting oxide fibers, such as doped $In_2O_3$ or others.

During operation, air flows through the center of the annular cells 12, and fuel passes over the exterior. Oxygen from air diffuses through the porous support 26 and cathode 28, and fuel diffuses through the anode 36. These process mediums electrochemically react through the electrolyte, generating products such as water vapor, carbon dioxide, heat and electrical energy. The high temperature wate vapor and carbon dioxide are carried away from the cell with, for example, unburned fuel, and electrical power is transferred in series from the inner cathode 28 of one cell to the outer anode 36 of the next cell. The electrical power is usefully drawn through the leads 14 and 16.

A variant of the cell structure is the circumferential segmentation of the elongated single cells as shown in FIG. 4. This segmentation alleviates circulating currents within the electrodes which tend to result from simultaneous exposure to rich and depleted reactants over the electrode surface. Segmentation exposes each electrode area to reactants of generally similar concentration. Without segmentation, one end of the cell is exposed to generally fresh reactants, and the other to depleted reactants. Referring to FIG. 4, segment 44 is exposed to a richer reactant concentration than segments 46 and 48, when flow of both reactants is in the direction of arrows 50. The segmentation can be provided, for example, by masking selected portions 60 of the porous support tube 26 during fabrication, and depositing only a layer of electronically insulating solid electrolyte on the selected portions, in order to insulate the segments 44, 46, 48 and seal the otherwise porous portions.

Figure 5:
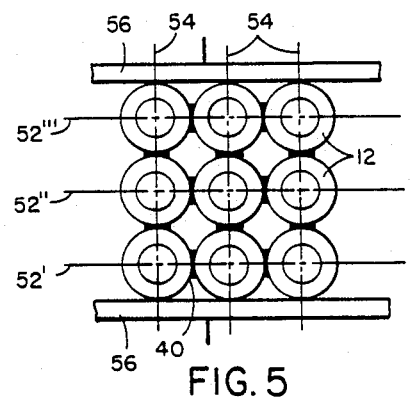
FIG. 5 is a schematic section view of a series-parallel interconnection configuration.

An advantageous fuel cell system configuration which is provided by the elongated surface contact among adjacent annular cells is shown in FIG. 5. The cells 12 are here positioned in a series-parallel electrical connection. For descriptive purposes, the arrangement includes rows 52 and columns 54. The cells of any given row 52', 52'', 52''' are electrically interconnected in parallel through the outer electrodes and metal felt 40'. Alternatively, the felt can be eliminated and the cells positioned to abut one another along their axial length. Use of the felt is, however, preferred, in order to insure a large contact surface and avoid potential structural damage to the outer electrodes. Consecutive cells 12 along a column 54 are electrically interconnected in series, as shown in FIG. 3, from the inner electrode of one cell to the outer electrode of the next cell. Thus, each cell in a row operates at substantially the same voltage, and voltage progressively changes among the cells of a column, typically varying by approximately one volt from cell-to-cell along a column. In this manner, any number of elongated cells can be interconnected to achieve a desired voltage and current output. Other configurations, in addition to the shown rectangular array, are equally possible.

The electrical power generated by the series-parallel interconnection is readily collected by only two plates 56, one in electrical contact with each cell of a row 52 at one extremity of the stack, and another in electrical contact with each cell of the row at the other extremity.

Since numerous changes may be made in the disclosed apparatus without departing from the spirit and scope thereof, it is intended that the material contained in the foregoing description and drawings be interpreted as illustrative, and not in a limiting sense.

I claim:

1. A high-temperature, solid electrolyte electrochemical cell configuration comprising a plurality of axially elongated annular cells, each cell having inner and outer annular electrodes with an electrolyte therebetween, said outer electrode and electrolyte having a discontinuity containing an electrically conductive interconnect adjacent a selected segment of said inner electrode, said interconnect extending a selected axial length along each said cell, said cells positioned adjacent one another in a series with an electrically conductive insert therebetween such that electrical contact is made, along said selected axial length, between said inner electrode of one cell and the outer electrode of the next adjacent cell.

2. The electrochemical cell configuration of claim 1 further comprising a current collector in electrical contact with the first of said cells in series, along said selected axial length, and another current collector in electrical contact with the last of said cells in series along said selected axial length.

3. The configuration of claim 1 wherein said electrically conductive insert comprises a metal felt interposed between consecutive cells.

4. The configuration of claim 1 wherein each said cell includes a plurality of segments, said segments of a cell being electrically segmented from one another.

5. A high temperature, solid electrolyte electrochemical cell configuration comprising a plurality of axially elongated annular cells, each cell having inner and outer annular electrodes with an electrolyte therebetween, said outer electrode and electrolyte having a discontinuity containing an electrically conductive interconnect in electrical communication with said inner electrode and electronically insulated from said outer electrode, said interconnect extending a selected axial length along each said cell, said cells positioned adjacent one another with a thin electrical conductor disposed axially therebetween, a first and second cell electrically connected to one another in series, from the inner electrode of said first cell, through said interconnect and thin electrical conductor to the outer electrode of said second cell, said first and a third cell electrically connected to one another in parallel, from the outer electrode of said first cell, through said thin electrical conductor to the outer electrode of said third cell.

6. The configuration of claim 5 further comprising a current collecting plate in electrical contact with said first and third cells.

7. A high temperature, solid electrolyte electrochemical cell configuration comprising a plurality of axially elongated annular fuel cells, each cell having inner and outer annular electrodes with an electrolyte therebetween, said outer electrode and electrolyte having a discontinuity containing an electrically conductive interconnect in electrical communication with said inner electrode and electronically insulated from said outer electrode, said interconnect extending a selected axial length along each said cell, said cells positioned adjacent one another, said adjacent cells arranged in rows and columns, the fuel cells in each row being electrically connected to one another in parallel, through their outer electrodes, whereby each cell in a row operates at a similar voltage, and the fuel cells in each column being electrically connected in series to the fuel cells in the next row along a column, whereby voltage changes from row to row along a column.

8. The configuration of claim 7 wherein said rows include a first row and a last row, and further comprising a first current collecting plate in electrical contact with each said fuel cell of said first row and a second current collecting plate in electrical contact with each said fuel cell of said last row.

9. A high-temperature, solid electrolyte electrochemical cell configuration comprising a plurality of axially elongated annular fuel cells, each cell comprising inner and outer axially elongated annular electrodes with a solid electrolyte therebetween, said outer electrode and electrolyte defining an axially elongated radial segment, said segment containing a gas impermeable electrically conductive interconnect in electrical communication with said segment of said inner electrode, said cells positioned adjacent one another with an electrically conductive insert therebetween such that electrical contact is made along said axially elongated radial segment, between said inner electrode of one cell and the outer electrode of a next adjacent cell.

10. An array of fuel cells comprising one central axially elongated fuel cell tubular structure and a plurality of adjacent, parallel, axially elongated fuel cell tubular structures, said fuel cell structures having one inner and one outer axially elongated electrode, where said central fuel structure is connected in series to an adjacent fuel cell structure, such that the inner electrode of the central fuel cell structure is electrically connected to the outer electrode of an adjacent fuel cell structure, and the central fuel cell structure is also connected in parallel to an adjacent fuel cell structure, such that the outer electrode of the central fuel cell structure is electrically connected to the outer electrode of an adjacent fuel cell structure.

11. A fuel cell structure comprising an axially elongated porous support tube, a first electrode surrounding an axial portion of said tube, a gas tight electrolyte partially surrounding said first electrode to provide an axially extending radial segment, an electrically conductive interconnect material disposed in said segment electrically coupled to said first electrode, and a second porous electrode partially surrounding said electrolyte and spaced from said interconnect material to avoid direct electrical communication therebetween.

12. The fuel cell structure of claim 11 wherein the axially extending electrodes and electrolyte define an active fuel cell and said interconnected material extends along said active length.

13. The fuel cell structure of claim 11 wherein the first electrode is an air electrode and the second electrode is a fuel electrode.

14. The fuel cell structure of claim 11 wherein the electrolyte is a solid oxide.

15. The fuel cell structure of claim 11 wherein the air electrode is a material selected from the group consisting of $LaMnO_3$, $CaMnO_3$, $LaNiO_3$, $LaCoO_3$, $LaCrO_3$, doped indium oxide, $In_2O_3$ and mixtures thereof, the fuel electrode is selected from the group consisting of nickel zirconia cermet and cobalt zirconia cermet, the electrolyte comprises solid yttria stabilized zirconia, and the interconnect material is gas impermeable.

16. A fuel cell structure comprising inner and outer axially elongated annular electrodes with a solid gas impermeable electrolyte therebetween, said inner electrode surrounding a porous axially elongated annular support tube, said outer electrode and electrolyte defining an axially elongated radial segment, said segment containing a gas impermeable electrically conductive interconnect in electrical communication with a segment of said inner electrode.

17. The fuel cell structure of claim 16 wherein the inner electrode is an air electrode, and the outer electrode is a fuel electrode.

18. The fuel cell structure of claim 16 wherein the electrolyte is a solid oxide.

19. The fuel cell structure of claim 16 wherein the air electrode is a material selected from the group consisting of $LaMnO_3$, $CaMnO_3$, $LaNiO_3$ and mixtures thereof, the fuel electrode is selected from the group consisting of nickel zirconia cermet and cobalt zirconia cermet, and the electrolyte comprises yttria stabilized zirconia.

20. The fuel cell structure of claim 16 wherein the support tube comprises calcia stabilized zirconia.

* * * * *